(12) United States Patent
Di et al.

(10) Patent No.: US 9,473,936 B2
(45) Date of Patent: Oct. 18, 2016

(54) METHOD AND DEVICE FOR PROTECTING PRIVACY INFORMATION

(71) Applicant: Xiaomi Inc., Beijing (CN)

(72) Inventors: Hao Di, Beijing (CN); Xinming Shi, Beijing (CN); Wei Sun, Beijing (CN)

(73) Assignee: Xiaomi Inc., Beijing (CN)

(*) Notice: Subject to any disclaimer, the term of this patent is extended or adjusted under 35 U.S.C. 154(b) by 117 days.

(21) Appl. No.: 14/076,429

(22) Filed: Nov. 11, 2013

(65) Prior Publication Data

US 2014/0148128 A1 May 29, 2014

Related U.S. Application Data

(63) Continuation of application No. PCT/CN2013/078927, filed on Jul. 5, 2013.

(30) Foreign Application Priority Data

Nov. 29, 2012 (CN) .......................... 2012 1 0500983

(51) Int. Cl.
*H04M 1/66* (2006.01)
*H04W 12/06* (2009.01)

(52) U.S. Cl.
CPC .................................. *H04W 12/06* (2013.01)

(58) Field of Classification Search
CPC .............................. H04W 88/02; H04W 12/08
See application file for complete search history.

(56) References Cited

U.S. PATENT DOCUMENTS

| | | | |
|---|---|---|---|
| 2006/0025110 A1* | 2/2006 | Liu | H04M 1/673 455/411 |
| 2007/0280515 A1* | 12/2007 | Goto | 382/124 |
| 2009/0311991 A1* | 12/2009 | Shin | 455/411 |
| 2010/0216429 A1* | 8/2010 | Mahajan | G06F 21/6245 455/411 |
| 2010/0275032 A1* | 10/2010 | Bhangi | G06F 21/34 713/182 |

FOREIGN PATENT DOCUMENTS

| | | |
|---|---|---|
| CN | 1801979 A | 7/2006 |
| CN | 101222706 A | 7/2008 |
| CN | 101616495 | 12/2009 |
| CN | 102457619 | 5/2012 |
| CN | 103023649 | 4/2013 |

* cited by examiner

*Primary Examiner* — Shantell L Heiber (74) *Attorney, Agent, or Firm* — Finnegan, Henderson, Farabow, Garrett & Dunner LLP (57) ABSTRACT

A method for protecting privacy information in a mobile terminal, including: granting, by the mobile terminal, user access according to an operation of a user, the granted access corresponding to the operation; enabling, by the mobile terminal, a protection mechanism set for the privacy information to be effective if the granted access does not include access to the privacy information; and disabling, by the mobile terminal, the protection mechanism set for the privacy information to be ineffective if the granted access includes access to the privacy information.

15 Claims, 8 Drawing Sheets

METHOD AND DEVICE FOR PROTECTING PRIVACY INFORMATION

CROSS-REFERENCE TO RELATED APPLICATIONS

This application is a continuation of International Application No. PCT/CN2013/078927, filed Jul. 5, 2013, which claims priority from Chinese Patent Application No. 201210500983.6, filed on Nov. 29, 2012, the entire contents of all of which are incorporated herein by reference.

TECHNICAL FIELD

The disclosure relates to the field of mobile communication and, more particularly, to a method and a device for protecting privacy information.

BACKGROUND

With the development of mobile communication technologies, mobile terminals are increasingly popularized in daily life of people. In recent years, functions integrated in the mobile terminals are increasing due to the development of an intelligent mobile terminal technology, which brings unprecedented, new experience for communication, life and entertainment. However, with the diversity of functions and application programs integrated in mobile terminals, co-workers and friends increasingly borrow mobile terminals from each other to experience new functions and new application programs. Therefore, the probability of leaking privacy information, such as a call history, short messages, and pictures in mobile terminals is increasing as well. Accordingly, a method of protecting privacy information in mobile terminals is desired.

A traditional method for protecting privacy information in a mobile terminal is to set only one password for the mobile terminal and, generally, only the owner of the mobile terminal knows the password. When the mobile terminal is lent to other users, such as friends of the owner and the like, the owner will input the password so as to allow the other users to access information in the mobile terminal.

SUMMARY

According to a first aspect of the present disclosure, there is provided a method for protecting privacy information in a mobile terminal, comprising: granting, by the mobile terminal, user access according to an operation of a user, the granted access corresponding to the operation; enabling, by the mobile terminal, a protection mechanism set for the privacy information to be effective if the granted access does not include access to the privacy information; and disabling, by the mobile terminal, the protection mechanism set for the privacy information to be ineffective if the granted access includes access to the privacy information.

According to a second aspect of the present disclosure, there is provided a non-transitory medium including instructions, executable by a processor in a mobile terminal, for performing a method for protecting privacy information in the mobile terminal, the method comprising: granting, by the mobile terminal, user access according to an operation of a user, the granted access corresponding to the operation; enabling, by the mobile terminal, a protection mechanism set for the privacy information to be effective if the granted access does not include access to the privacy information; and disabling, by the mobile terminal, the protection mechanism set for the privacy information to be ineffective if the granted access includes access to the privacy information.

According to a third aspect of the present disclosure, there is provided a mobile terminal, comprising: a processor; and a memory for storing privacy information; wherein the processor is configured to: grant user access according to an operation of a user, the granted access corresponding to the operation; enable a protection mechanism set for the privacy information to be effective if the granted access does not include access to the privacy information; and disable the protection mechanism set for the privacy information to be ineffective if the granted access includes access to the privacy information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
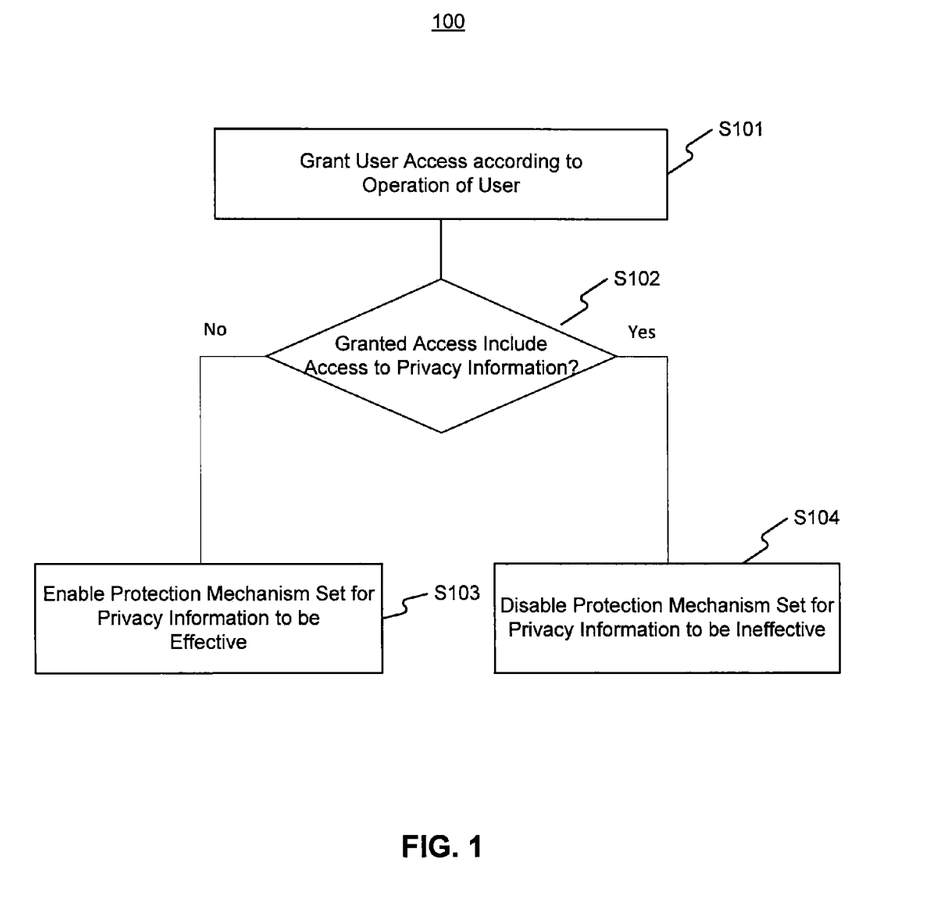
FIG. 1 is a flowchart of a privacy information protection method, according to an exemplary embodiment.

FIG. 1 is a flowchart of a privacy information protection method 100 for use in a device, such as a mobile terminal, according to an exemplary embodiment. Referring to FIG. 1, in step S101, the mobile terminal grants user access according to an operation of a user, the granted access corresponding to the operation. In exemplary embodiments, the operation of the user may be an operation to input a system unlocking password, an operation to input a protection password other than the system unlocking password, an operation to click a specific functional key such as a switch preset by the user, or the like. It is according to the operation of the user that the mobile terminal grants user access corresponding to the operation of the user. The system unlocking password and the protection password may each be of one or more characters or a graphical password, and are not limited to a specific form.

As used in this disclosure, the user of the mobile terminal may be an owner of the mobile terminal, or one who uses the mobile terminal but is not the owner of the mobile terminal, such as a friend or a co-worker of the owner; and the privacy information refers to information which is set with a protection mechanism using a protection password because of not being suitable for viewing by other people than the owner of the mobile terminal, or information that the owner is unwilling to share with other people, such as a call history, short messages, pictures, media information including videos, and the like.

In step S102, the mobile terminal determines if the granted access includes access to the privacy information in the mobile terminal. If the mobile terminal determines that the granted access does not include access to the privacy information (S102—No), the mobile terminal enables the protection mechanism set for the privacy information so that the protection mechanism is effective in step S103. If the mobile terminal determines that the granted access includes access to the privacy information (S102—Yes), the mobile terminal disables the protection mechanism set for the privacy information to be ineffective in step S104.

Different from the traditional method where only one password is set for the mobile terminal to protect the whole system, in the method 100, the owner of the mobile terminal can set a corresponding protection mechanism for each piece of, or each category of, privacy information in advance to limit access to the privacy information. For example, the owner may set a corresponding protection password for a picture or a short message, or place a plurality of pictures or short messages together in a document folder and set a corresponding protection password for the document folder, or set protection passwords for functional modules corresponding to the privacy information, for example, application programs of receiving and transmitting short messages, application programs of browsing pictures, and the like. In this way, in the event that a user other than the owner wants to borrow the mobile terminal from the owner, when the mobile terminal determines that an operation of the user has no granted access to the privacy information, the mobile terminal enables the protection mechanism set for the privacy information so that the user cannot access the privacy information. If the mobile terminal determines that the user has granted access to the privacy information, the mobile terminal disables the protection mechanism set for the privacy information.

In exemplary embodiments, the protection mechanism set for the privacy information has two states, that is, an effective state and an ineffective state. The effective state means that, when the user attempts to access the privacy information, the mobile terminal will require that the user input a preset protection password (in the form of character or graphic) if it is determined that the granted access corresponding to the operation of the user does not include access to the privacy information, and the user can freely access the privacy information only after inputting a correct protection password. The ineffective state means that the protection mechanism has no effect on the operation of the user, and the user can freely access the privacy information without inputting the protection password if the mobile terminal determines that the granted access corresponding to the operation of the user includes access to the privacy information.

In exemplary embodiments, access corresponding to an operation of the user can be granted according to the operation, so that a protection mechanism is disabled only when the granted access is determined to include access to the privacy information, and the protection mechanism is enabled when the granted access is determined not to include access to the privacy information. Therefore, compared with the traditional method of setting one password for a mobile terminal to limit access to the whole system, the method 100 provides a strong protection for the privacy information of the owner stored in the mobile terminal, so that a user other than the owner cannot freely access the privacy information in a guest mode, as described below. Therefore, not only the flexibility of setting passwords is improved, but also the owner of the mobile terminal does not need to worry about that the privacy information in the mobile terminal would be leaked when the mobile terminal is lent to other persons, such as friends, co-workers and the like. Even if the mobile terminal is lost carelessly, the owner of the mobile terminal may not be harmed due to no leakage of the privacy information.

In exemplary embodiments, there are first and second modes for accessing information in the mobile terminal by a user, that is, an owner mode and a guest mode. In the owner mode, the user has the same granted access as the owner of the mobile terminal and can freely access all information in the mobile terminal, including the privacy information. In the guest mode, the user can only access general, non-privacy information in the mobile terminal, and cannot freely access the privacy information unless the user inputs a corresponding protection password.

As described above, the operation of the user may be an operation to input a protection password other than the system unlocking password. In exemplary embodiments, to grant access corresponding to the operation of the user according to the operation, the mobile terminal may perform the following steps: determining an access mode corresponding to a system level password inputted by the user according to the system level password; determining that the access to be granted includes access to the privacy information if it is determined that the access mode corresponding to the system level password is the owner mode; and determining that the access to be granted does not include access to the privacy information if it is determined that the access mode corresponding to the system level password is the guest mode.

The system level password may be considered as a level I password set for accessing the mobile terminal, and the protection password is an information level password set for accessing the privacy information by the owner of the mobile terminal and may be considered as a level II password. The owner of the mobile terminal can preset corresponding level I passwords for corresponding access modes, e.g., the owner mode and the guest mode, respectively, and the mobile terminal stores the preset level I passwords. When the user inputs a level I password, the mobile terminal compares the inputted level I password with the preset level I passwords stored in the mobile terminal to determine if there is a match, and further determines, if there is a match, whether a current access mode of the user is the owner mode or the guest mode according to the inputted level I password. For example, provided that the level I password "234" preset by the owner of the mobile terminal corresponds to the owner mode, and that the preset level I password "567" corresponds to the guest mode, when the user inputs the password "234," the mobile terminal determines that the current access mode of the user is the owner mode. In other words, the mobile terminal determines that the access to be granted includes access to the privacy information. When the user inputs the password "567," the mobile terminal determines that the current access mode of the user is the guest mode. In other words, the mobile terminal determines that the access to be granted does not include access to the privacy information. In the illustrated embodiment, the level I password is, for example, the unlocking password of the mobile terminal, which may be a character password or a graphical password.

In exemplary embodiments, if the mobile terminal determines that the access to be granted includes access to the privacy information, to disable the protection mechanism set for the privacy information, the mobile terminal further performs the following steps: assigning a first value to an enabling parameter of the protection password set for the privacy information; and after detecting that the first value has been assigned to the enabling parameter of the protection password, setting the protection password to be ineffective.

In exemplary embodiments, if the mobile terminal determines that the access to be granted does not include access to the privacy information, to enable the protection mechanism set for the privacy information, the mobile terminal further performs the following steps: assigning a second value to the enabling parameter of the protection password set for the privacy information; and after detecting that the second value has been assigned to the enabling parameter of the protection password, setting the protection password to be effective.

In exemplary embodiments, the enabling parameter of the protection password is used for determining the effective or ineffective state of the protection password. For example, when the enabling parameter of the protection password is one value, the protection password is effective; and when the enabling parameter of the protection password is another value, the protection password is ineffective. The values corresponding to the effective state and the ineffective state of the protection password are respectively referred herein as the first value and the second value. In the illustrated embodiment, because the protection password has two states, two logic values of "1" and "0" in two-valued logic may be respectively used as the first value and the second value. Alternatively, it can be the opposite, that is, "0" and "1" in two-valued logic may be respectively used as the first value and the second value. For convenience of illustration, "1" and "0" in two-valued logic are respectively used as the first value and the second value in the description below.

When the current access mode of the user is determined to be the owner mode corresponding to the level I password, for example, the level I password "234" is inputted by the user in the above described embodiment, the mobile terminal assigns the first value (e.g., "1" in two-valued logic) to the enabling parameter of the protection password set for the privacy information. When the first value is assigned to the enabling parameter of the protection password, the protection password is set to be in the ineffective state. As a result, the user can freely access the privacy information in the mobile terminal. When the current access mode of the user is determined to be the guest mode corresponding to the level I password, for example, the level I password "567" is inputted by the user in the above described embodiment, the mobile terminal assigns the second value (e.g., "0" in two-valued logic) to the enabling parameter of the protection password set for the privacy information. When the second value is assigned to the enabling parameter of the protection password, the protection password is enabled to be effective. As a result, the user can not freely access the privacy information in the mobile terminal, and needs to input a preset protection password to access it.

As described above, the operation of the user may be an operation to input the system unlocking password of the mobile terminal. In one exemplary embodiment, to grant access corresponding to the operation of the user, the mobile terminal determines whether the current access mode of the user is the owner mode or the guest mode according to whether or not the password inputted by the user is the system unlocking password. If the password inputted by the user is the system unlocking password, it is determined that the current access mode of the user is the owner mode and, as a result, the user is granted access to the privacy information. If the mobile terminal has been unlocked, the access mode can be determined according to the state of a preset switch, wherein the preset switch can be a specific functional key, and is used for switching between the guest mode and the owner mode. If it is determined that the access mode is the owner mode, the granted access is determined to include access to the privacy information; and if it is determined that the access mode is the guest mode, the granted access is determined not to include access to the privacy information.

In the illustrated embodiment, the access mode of the user is determined based on one level I password, i.e., the system unlocking password, but not two different level I passwords. When the user starts up the mobile terminal or unlocks the screen of the mobile terminal, the system unlocking password will be inputted. The owner mode and the guest mode are switched through the preset switch, i.e., the specific functional key in the illustrated embodiment.

For example, when the user inputs the system unlocking password, e.g., "08x9," the current access mode of the user is determined to be the owner mode and, as a result, the user has access to the privacy information. If the user further operates the preset switch, e.g., clicks the specific functional key, when the mobile terminal has been unlocked, the current access mode of the user is determined to be the guest mode and, as a result, the user has no access to the privacy information.

In the illustrated embodiment, although the user operates the preset switch when the mobile terminal has been unlocked so as to switch to the guest mode, the user cannot re-enter the owner mode by operating the preset switch in the guest mode. This is because, if the owner mode can be re-entered from the guest mode, the user who is not the owner of the mobile terminal may intentionally or accidentally click the specific functional key to obtain access to the privacy information in the mobile terminal. Therefore, the privacy information of the owner of the mobile terminal may not be protected. In one exemplary embodiment, the preset switch may be locked or set to be in an ineffective state in the guest mode, and, to unlock the preset switch, the user needs to exit the guest mode, and enter the owner mode through inputting the system unlocking password.

In exemplary embodiments, if it is according to whether the password inputted by the user is the system unlocking password that the mobile terminal determines that the current access mode of the user is the owner mode, the mobile terminal sets the protection password for the privacy information to be ineffective by default.

In exemplary embodiments, if it is according to whether the password inputted by the user is the system unlocking password that the mobile terminal determines that the current access mode of the user is the guest mode, the mobile terminals further performs the following steps: assigning an enabling value to the enabling parameter of the protection password set for the privacy information; and after it is detected that the enabling value is assigned to the enabling parameter of the protection password, enabling the protection password so that the protection password takes effect, and setting the specific functional key to be ineffective.

As described above, two values, e.g., "1" and "0" in two-valued logic, of enabling parameters of the protection password can be used for determining the effective and ineffective states of the protection password, respectively. In the illustrated embodiment, if it is determined that the current access mode of the user is the owner mode, the protection password is ineffective by default, and the enabling parameter of the protection password has a default value "1." Thus, the user can freely access the privacy information in the mobile terminal. If it is determined that the current access mode of the user is the guest mode, after the mobile terminal detects that the enabling value (i.e., "0" in two-valued logic) is assigned to the enabling parameter of the protection password, the protection password is enabled to be effective and the preset switch is set to be ineffective. As a result, the user cannot freely access the privacy information in the mobile terminal, and needs to input the preset protection password if the user wants to access it.

In the above-illustrated embodiment, after the mobile terminal determines that the access to be granted does not include access to the privacy information so as to set the protection mechanism for the private information to be effective, if the user accesses preset items in the privacy information, the mobile terminal reminds the user to carry out identity authentication after receiving an access request of the user on the preset items, and then determines whether access to the preset items in the privacy information is granted according to a result of the identity authentication. For example, the preset items in the privacy information may be electronic books, address books, information or the like, and reminding the user to carry out identify authentication may be reminding the user to input the password, and the like.

Figure 2:
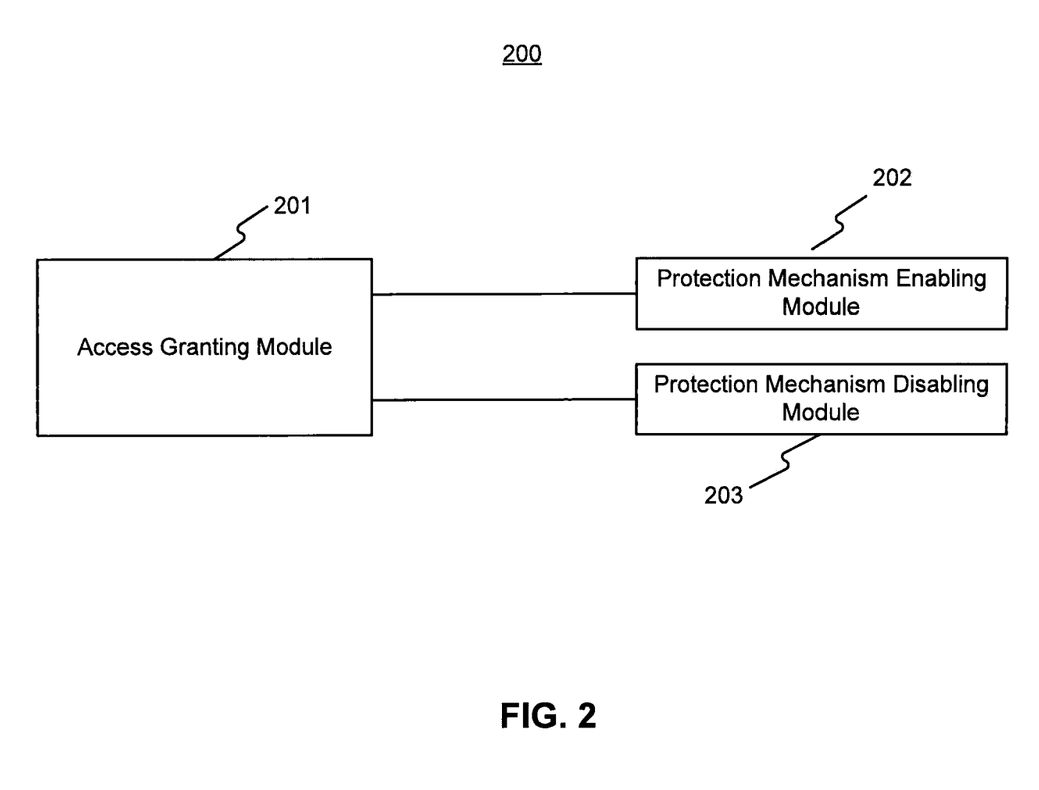
FIGS. 2-7 illustrate block diagrams of a privacy information protection device, according to exemplary embodiments.

FIG. 2 illustrates a block diagram of a device 200 for performing the privacy information protection method 100 (FIG. 1), according to an exemplary embodiment. For example, the device 200 may be the mobile terminal described above. Referring to FIG. 2, the device 200 includes an access granting module 201, a protection mechanism enabling module 202, and a protection mechanism disabling module 203.

In exemplary embodiments, the access granting module 201 is configured to grant user access according to an operation of a user, the granted access corresponding to the operation. As described above, the operation of the user may be an operation to input a system unlocking password, an operation to input a protection password other than the system unlocking password, an operation to click a specific functional key such as a switch preset by the user, or the like. The access granting module 201 is configured to grant user access corresponding to the operation of the user.

In exemplary embodiments, the protection mechanism enabling module 202 is configured to enable the protection mechanism set for the privacy information to be effective if the access granted by the access granting module 201 does not include access to the privacy information, so that the user cannot freely access the privacy information. The protection mechanism disabling module 203 is configured to disable the protection mechanism set for the privacy information to be ineffective if the access granted by the access granting module 201 includes access to the privacy information, so that the user can freely access the privacy information.

In the above illustrated embodiments, the division of modules is only exemplified, and in actual application, the device 200 may be implemented with different modules according to, for example, configuration requirements of corresponding hardware or consideration of realization convenience of software. In other words, the internal structure of the device 200 may be divided into different modules to implement all or part of the method 100 (FIG. 1) described above. In addition, in actual application, the modules in the illustrated embodiment can be realized by corresponding hardware, and may also be implemented by executing corresponding software. For example, the access granting module 201 may be hardware for executing the above-described operation of granting user access according to the operation of the user, such as an access authority, and may also be a processor or other hardware capable of executing corresponding computer programs so as to perform the above-described operations. As another example, the protection mechanism enabling module 202 may be hardware, such as a device for effectuating the mechanism, or may also be a processor or other hardware capable of executing the corresponding computer programs so as to perform the above-described operations.

Figure 3:
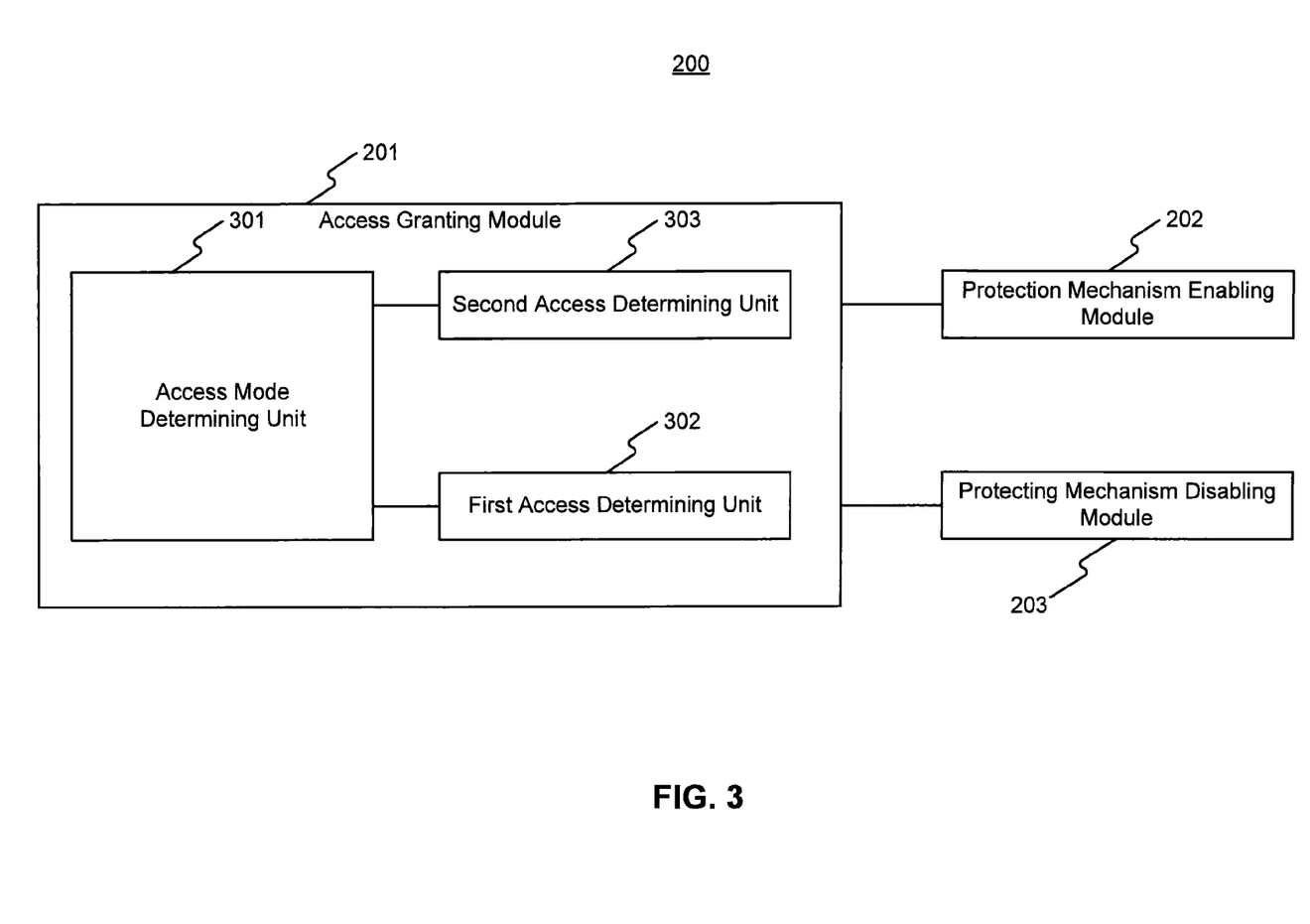

FIG. 3 illustrates a block diagram of the access granting module 201 in the device 200 (FIG. 2), according to an exemplary embodiment. Referring to FIG. 3, the access granting module 201 includes an access mode determining unit 301, a first access determining unit 302, and a second access determining unit 303.

In exemplary embodiments, the access mode determining unit 301 is configured to determine an access mode corresponding to a current level I password inputted by the user according to the level I password. The first access determining unit 302 is configured to determine that the access to be granted includes access to the privacy information if the access mode determining unit 301 determines that the access mode is the owner mode corresponding to the level I password. The second authority determining unit 303 is configured to determine that the access to be granted does not include access to the privacy information if the access mode determining unit 301 determines that the access mode is the guest mode corresponding to the level I password. In one exemplary embodiment, when the user inputs the level I password, the access mode determining unit 301 compares the inputted level I password and a preset level I password stored in the device 200, and determines that the access mode of the user is the owner mode corresponding to the inputted level I password if there is a match, as described above.

Figure 4:
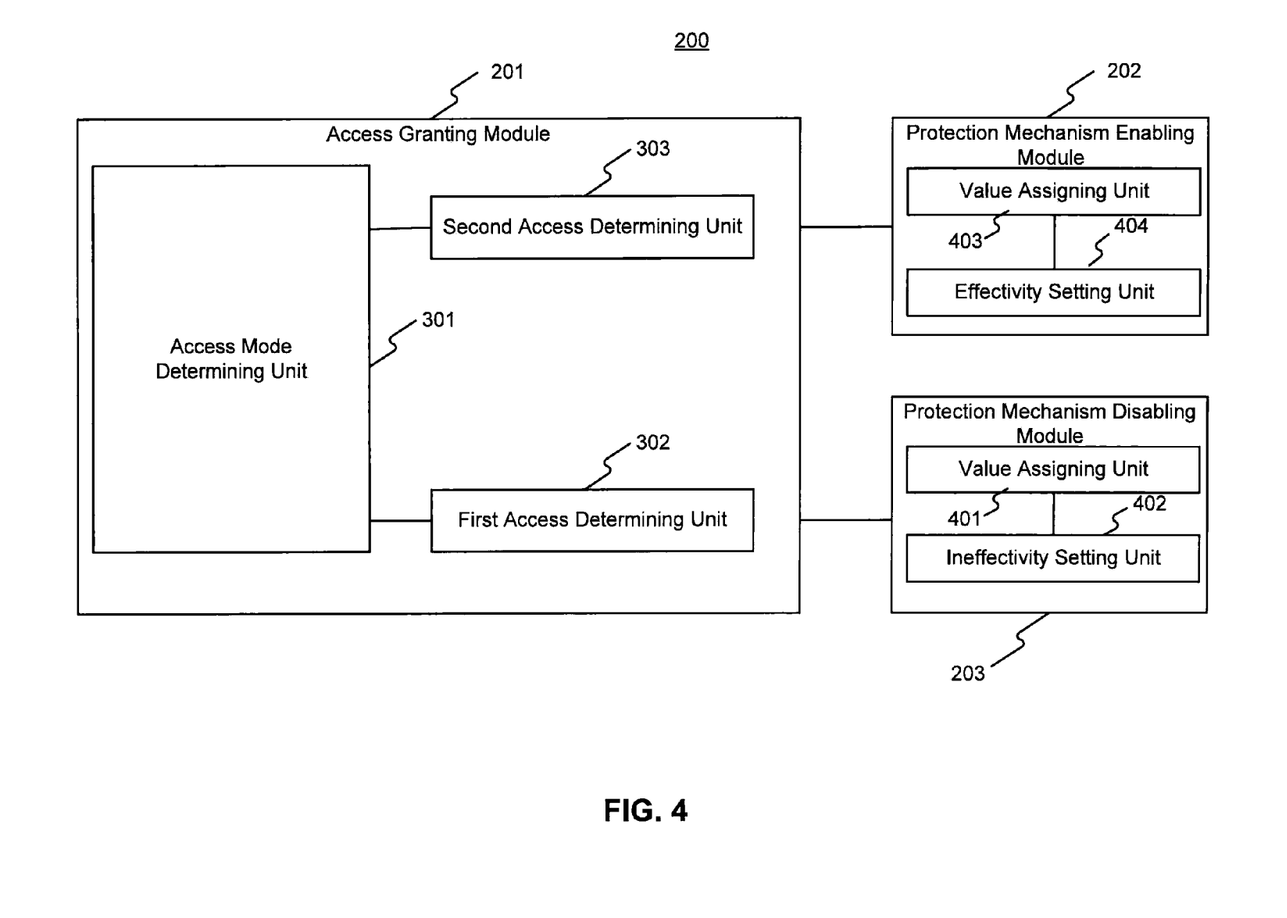

FIG. 4 further illustrates block diagrams of the protection mechanism enabling module 202 and the protection mechanism disabling module 203 in the device 200 (FIG. 2), according to an exemplary embodiment. Referring to FIG. 4, the protection mechanism disabling module 203 includes a value assigning unit 401 and an ineffectivity setting unit 402, and the mechanism enabling module 202 includes a value assigning unit 403 and an effectivity setting unit 404.

In exemplary embodiments, the value assigning unit 401 is configured to assign a first value to an enabling parameter of the protection password set for the privacy information when the first access determining unit 302 determines that the access to be granted includes access to the privacy information. The ineffectivity setting unit 402 is configured to set the protection password to be ineffective after detecting that the first value is assigned to the enabling parameter of the protection password.

In exemplary embodiments, the value assigning unit 403 is configured to assign a second value to the enabling parameter of the protection password set for the privacy information when the second access determining unit 303 determines that the access to be granted does not include access to the privacy information. The effectivity setting unit 404 is configured to set the protection password to be effective after detecting that the second value is assigned to the enabling parameter of the protection password.

For example, when the access mode determining unit 301 determines that the current access mode of the user is the owner mode corresponding to the level I password, for example, when the level I password "234" is inputted by the user in the above described embodiment, the assigning unit 401 assigns the first value (e.g., "1" in two-valued logic) to the enabling parameter of the protection password. After the ineffectivity setting unit 402 detects that the first value is assigned to the enabling parameter of the protection password, it sets the protection password to be ineffective and, as a result, the user can freely access the privacy information in the mobile terminal. When the access mode determining unit 301 determines that the current access mode of the user is the guest mode corresponding to the level I password, for example, when the level I password "567" is inputted by the user in the above described embodiment, the assigning unit 403 assigns the second value (e.g., "0" in two-valued logic) to the enabling parameter of the protection password. After the effectivity setting unit 404 detects that the second value is assigned to the enabling parameter of the protection password, it enables the protection password to be effective and, as a result, the user cannot freely access the privacy information in the mobile terminal, and needs to input the preset protection password to access it.

Figure 5:
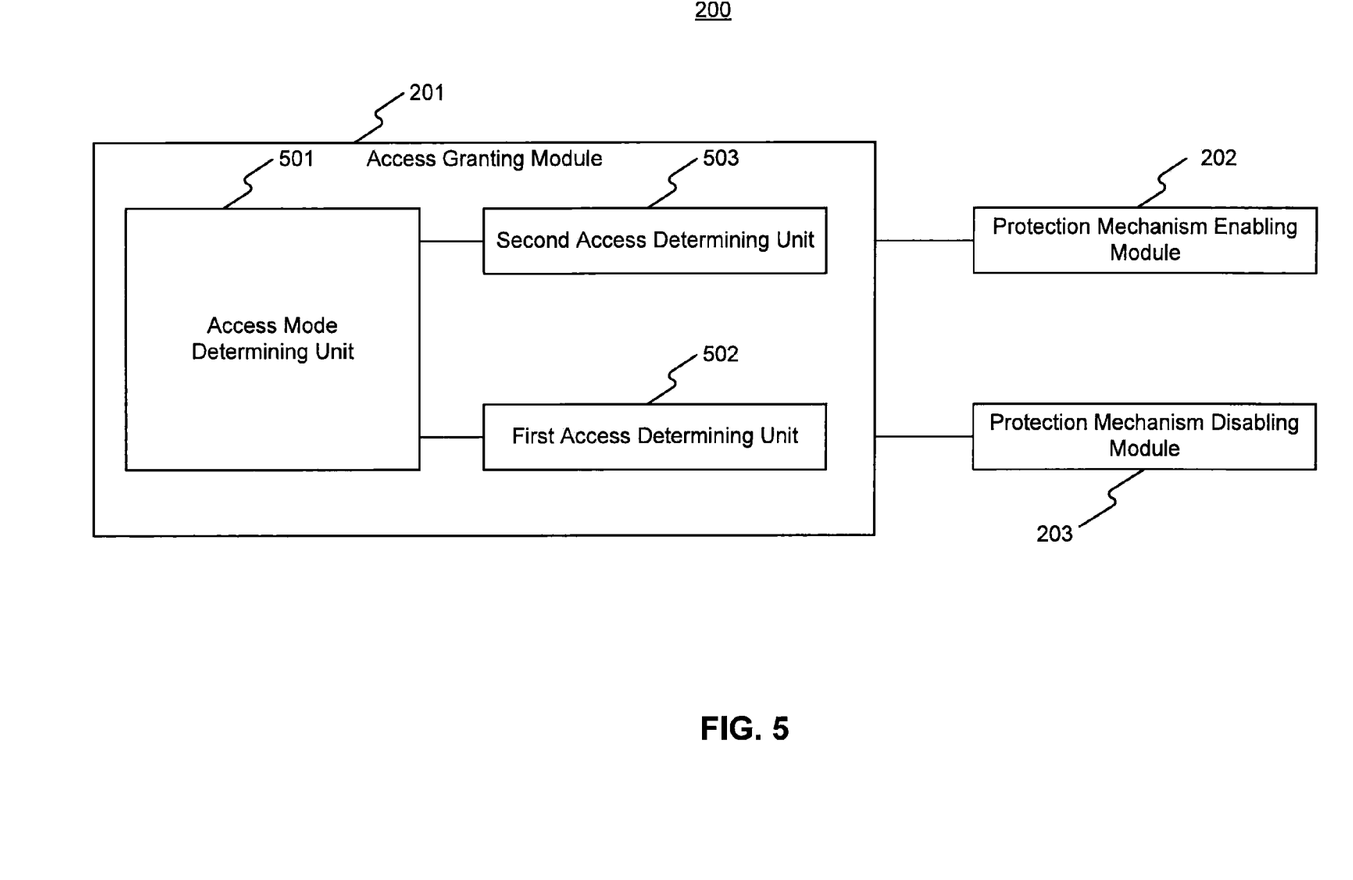

FIG. 5 illustrates a block diagram of the access granting module 201 in the device 200 (FIG. 2), according to an exemplary embodiment. Referring to FIG. 5, the access granting module 201 includes an access mode determining unit 501, a first access determining unit 502, and a second access determining unit 503.

In exemplary embodiments, the access mode determining unit 501 is configured to determine an access mode of the user according to the state of a preset switch for opening or closing the guest mode. The first access determining unit 502 is configured to determine that the access to be granted includes access to the privacy information if the access mode determining unit 501 determines that the access mode is the owner mode. The second access determining unit 503 is configured to determine that the access to be granted does not include access to the privacy information if the access mode determining unit 501 determines that the access mode is the guest mode.

In exemplary embodiments, when the user inputs the system unlocking password, such as "08x9," the access mode determining unit 501 determines that the current access mode of the user is the owner mode and, thus, the first access determining unit 502 determines that the user has the permission of accessing the privacy information. If the user further operates the preset switch (e.g., clicks the specific functional key) when the device 200 has been unlocked, the access mode determining unit 501 determines that the current access mode of the user is the guest mode and, thus, the second access determining unit 503 determines that the user has no access to the privacy information in the mobile terminal.

Figure 6:
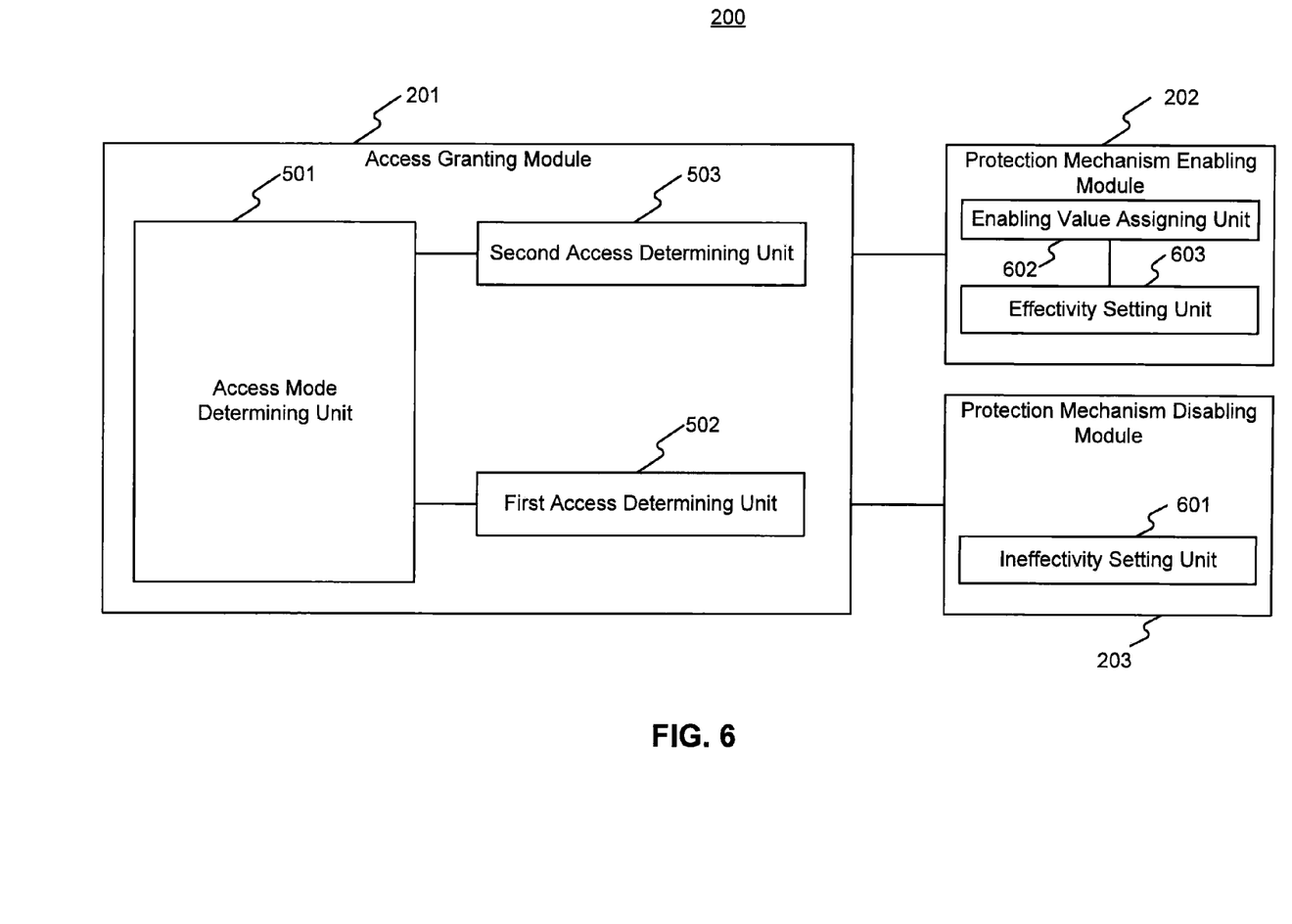

FIG. 6 illustrates a block diagram of the protection mechanism enabling module 202 and the protection mechanism disabling module 203 in the device 200 (FIG. 5), according to an exemplary embodiment. Referring to FIG. 6, the protection mechanism disabling module 203 includes an ineffectivity setting unit 601, and the protection mechanism enabling module 202 includes an enabling value assigning unit 602 and an effectivity setting unit 603.

In exemplary embodiments, the ineffectivity setting unit 601 is configured to disable the protection password by default if the first access determining unit 502 determines that the access to be granted includes access to the privacy information. The enabling value assigning unit 602 is configured to assign an enabling value to an enabling parameter of the protection password if the second access determining unit 503 determines that the access to be granted does not include access to the privacy information. The effectivity setting unit 603 is configured to enable the protection password to be effective and set the specific functional key to be ineffective after detecting that the enabling value is assigned to the enabling parameter of the protection password.

In exemplary embodiments, if the access mode determining unit 501 determines that the access mode of the user is the owner mode according to the state of the preset switch, and the first access determining unit 502 determines that the access to be granted includes access to the privacy information, the ineffectivity setting unit 601 sets the protection password to be ineffective by default. For example, if the values of the enabling parameter of the protection password being "1" and "0" in two-valued logic respectively correspond to the ineffective and effective states of the protection password, the enabling parameter of the protection password has a default value of "1," so that the user can freely access the privacy information in the mobile terminal. If the access mode determining unit 501 determines that the current access mode of the user is the guest mode according to the state of the preset switch, and the second determining unit 503 determines that the access to be granted does not include access to the privacy information, the enabling value assigning unit 602 assigns the enabling value to the enabling parameter of the protection password, for example, "0" in the two-valued logic. After the effectivity setting unit 603 detects that the enabling value is assigned to the enabling parameter of the protection password, it enables the protection password to be effective and sets the specific functional key to be ineffective. As a result, the user cannot freely access the privacy information in the mobile terminal, and needs to input the preset protection password to access it.

Figure 7:
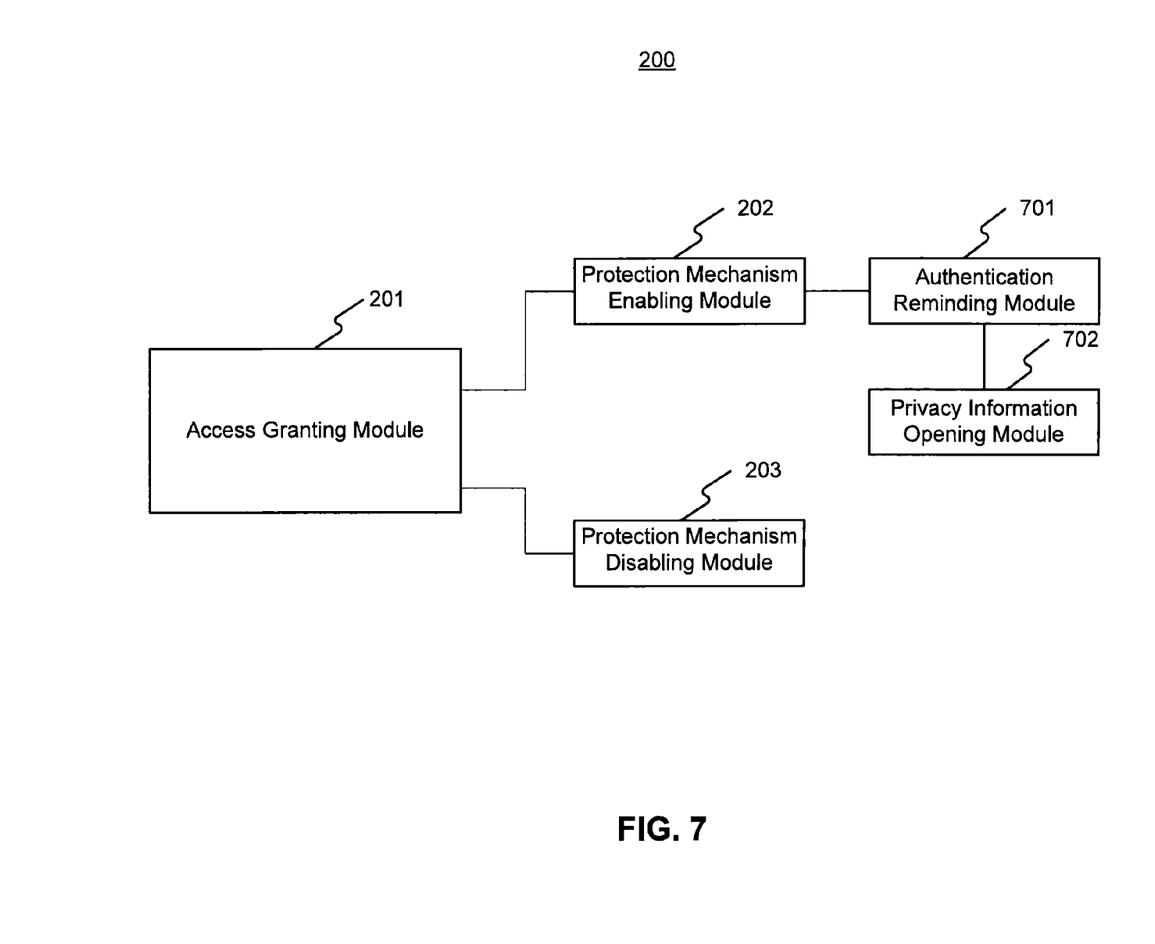

In exemplary embodiments, the device 200 may further include an authentication reminding module 701 and a privacy information opening module 702, as illustrated in FIG. 7.

Referring to FIG. 7, in exemplary embodiments, the authentication reminding module 701 is configured to receive an access request of the user on preset items in the privacy information and remind the user to carry out identity authentication. The privacy information opening module 702 is configured to determine whether or not access to the preset items in the privacy information is granted according to an identity authentication result.

Figure 8:
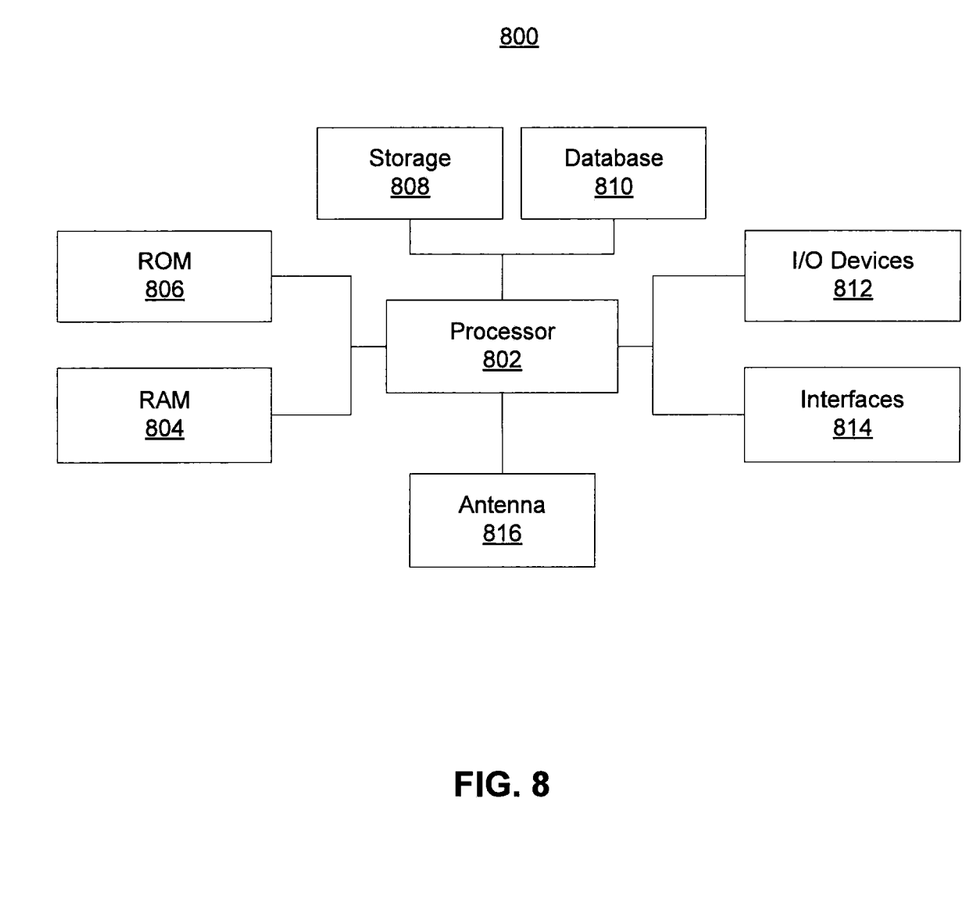
FIG. 8 illustrates a block diagram of a mobile terminal, according to an exemplary embodiment.

FIG. 8 illustrates a block diagram of the above-described mobile terminal, referred to herein as a mobile terminal 800, according to an exemplary embodiment. Referring to FIG. 8, the mobile terminal 800 may include one or more of the following components: a processor 802 configured to execute program instructions to perform the above described methods for protecting privacy information, random access memory (RAM) 804 and read only memory (ROM) 806 configured to access and store information and program instructions, storage 808 to store data and information, databases 810 to store tables, lists, or other data structures, I/O devices 812, interfaces 814, an antenna 816, etc.

In exemplary embodiments, there is also provided a non-volatile storage medium including instructions, executable by the processor 802 in the mobile terminal 800, for performing the above described methods for protecting privacy information.

One of ordinary skill in the art would understand that the above-described methods may be realized through, software, hardware, or a combination of software and hardware. The software may be stored in the non-volatile storage medium. It may include certain commands for a piece of computer equipment (e.g., a PC, a server, or network equipment) to implement the above-described methods.

One of ordinary skill in the art would understand that multiple ones of the above-described modules may be combined into one module, and any of the above-described modules may be further divided into multiple sub-modules. One of ordinary skill in the art would also understand that multiple ones of the above-described units may be combined into one unit, and any of the above-described units may be further divided into multiple sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for protecting privacy information in a mobile terminal, comprising:
   granting, by the mobile terminal, user access according to an operation of a user and a preset password stored in the mobile terminal, the granted access corresponding to the operation;
   enabling, by the mobile terminal, a protection mechanism set for the privacy information to be effective if the granted access does not include access to the privacy information; and
   disabling, by the mobile terminal, the protection mechanism set for the privacy information to be ineffective if the granted access includes access to the privacy information,
   wherein the granting of user access includes:
      determining that the access to be granted includes access to the privacy information if an access mode is an owner mode; and
      determining that the access to be granted does not include access to the privacy information if the access mode is a guest mode,
         wherein the owner mode enables switching from the owner mode to the guest mode by a preset switch on the mobile terminal without an identification authentication; and
         the guest mode disables switching from the guest mode to the owner mode without the identification authentication, and enables access to information other than the privacy information on the mobile terminal.

2. The method according to claim 1, wherein the granting of user access further comprises:
   determining the access mode according to a system level password inputted by the user.

3. The method according to claim 1, wherein the granting of user access further comprises:
   determining the access mode according to a state of the preset switch for opening or closing the guest mode.

4. The method according to claim 2, after enabling the protection mechanism set for the privacy information to be effective, further comprising:
   receiving an access request of the user on a preset item in the privacy information, and reminding the user to carry out identity authentication; and
   determining whether or not to grant access to the preset item in the privacy information according to a result of the identity authentication.

5. The method according to claim 3, after enabling the protection mechanism set for the privacy information to be effective, further comprising:
   receiving an access request of the user on a preset item in the privacy information, and reminding the user to carry out identity authentication; and
   determining whether or not to grant access to the preset item in the privacy information according to a result of the identity authentication.

6. A non-transitory medium including instructions, executable by a processor in a mobile terminal, for performing a method for protecting privacy information in the mobile terminal, the method comprising:
   granting, by the mobile terminal, user access according to an operation of a user and a preset password stored in the mobile terminal, the granted access corresponding to the operation;
   enabling, by the mobile terminal, a protection mechanism set for the privacy information to be effective if the granted access does not include access to the privacy information; and
   disabling, by the mobile terminal, the protection mechanism set for the privacy information to be ineffective if the granted access includes access to the privacy information,
   wherein the granting of user access includes:
      determining that the access to be granted includes access to the privacy information if an access mode is an owner mode; and
      determining that the access to be granted does not include access to the privacy information if the access mode is a guest mode,
         wherein the owner mode enables switching from the owner mode to the guest mode by a preset switch on the mobile terminal without an identification authentication; and
         the guest mode disables switching from the guest mode to the owner mode without the identification authentication, and enables access to information other than the privacy information on the mobile terminal.

7. The non-transitory medium according to claim 6, wherein the granting of user access further comprises:
   determining the access mode according to a system level password inputted by the user.

8. The non-transitory medium according to claim 6, wherein the granting of user access comprises:
   determining the access mode according to a state of the preset switch for opening or closing the guest mode.

9. The non-transitory medium according to claim 7, after enabling the protection mechanism set for the privacy information to be effective, the method further comprising:

receiving an access request of the user on a preset item in the privacy information, and reminding the user to carry out identity authentication; and determining whether or not to grant access to the preset item in the privacy information according to a result of the identity authentication.

10. The non-transitory medium according to claim 8, after enabling the protection mechanism set for the privacy information to be effective, the method further comprising:

receiving an access request of the user on a preset item in the privacy information, and reminding the user to carry out identity authentication; and determining whether or not to grant access to the preset item in the privacy information according to a result of the identity authentication.

11. A mobile terminal, comprising:
a processor; and
a memory for storing privacy information;
wherein the processor is configured to:
grant user access according to an operation of a user and a preset password stored in the memory, the granted access corresponding to the operation;
enable a protection mechanism set for the privacy information to be effective if the granted access does not include access to the privacy information; and
disable the protection mechanism set for the privacy information to be ineffective if the granted access includes access to the privacy information,
wherein the granting of user access includes:
determining that the access to be granted includes access to the privacy information if an access mode is an owner mode; and
determining that the access to be granted does not include access to the privacy information if the access mode is a guest mode, wherein the owner mode enables switching from the owner mode to the guest mode by a preset switch on the mobile terminal without an identification authentication; and the guest mode disables switching from the guest mode to the owner mode without the identification authentication, and enables access to information other than the privacy information on the mobile terminal.

12. The mobile terminal according to claim 11, wherein the processor is further configured to:
determine the access mode according to a system level password inputted by the user.

13. The mobile terminal according to claim 11, wherein the processor is further configured to:
determine the access mode according to a state of the preset switch for opening or closing the guest mode.

14. The mobile terminal according to claim 12, wherein the processor is further configured to:
receive an access request of the user on a preset item in the privacy information and remind the user to carry out identity authentication; and
determine whether or not to grant access to the preset item in the privacy information according to a result of the identity authentication.

15. The mobile terminal according to claim 13, wherein the processor is further configured to:
receive an access request of the user on a preset item in the privacy information, and remind the user to carry out identity authentication; and
determine whether or not to grant access to the preset item in the privacy information according to a result of the identity authentication.

* * * * *